(12) United States Patent
Su

(10) Patent No.: US 9,150,233 B2
(45) Date of Patent: Oct. 6, 2015

(54) FOLDABLE CART

(71) Applicant: Chung-Hsiu Su, Kaohsiung (TW)

(72) Inventor: Chung-Hsiu Su, Kaohsiung (TW)

( * ) Notice: Subject to any disclaimer, the term of this patent is extended or adjusted under 35 U.S.C. 154(b) by 0 days.

(21) Appl. No.: 14/531,280

(22) Filed: Nov. 3, 2014

(65) Prior Publication Data

US 2015/0137487 A1    May 21, 2015

(30) Foreign Application Priority Data

Nov. 18, 2013    (TW) .............................. 102221515 U

(51) Int. Cl.
*B62B 5/00* (2006.01)
*B62B 3/02* (2006.01)

(52) U.S. Cl.
CPC ...................... *B62B 3/022* (2013.01)

(58) Field of Classification Search
CPC .......... B62B 1/12; B62B 1/002; B62B 1/042; B62B 2205/12; B62B 2205/33; B62B 3/02; B62B 2206/006; B62B 5/067
USPC ......... 280/638, 35, 639, 38, 39, 40, 641, 645, 280/646, 651, 652, 654, 659, 47.1, 31, 280/47.17, 47.2, 47.23, 47.24, 47.27, 47.29
See application file for complete search history.

(56) References Cited

U.S. PATENT DOCUMENTS

| | | | |
|---|---|---|---|
| 3,578,353 A * | 5/1971 | Lockhart ...................... 280/47.2 |
| 7,097,183 B1 * | 8/2006 | Su .............................. 280/47.29 |
| 8,413,999 B2 | 4/2013 | Nassaux et al. |
| 2011/0285113 A1 * | 11/2011 | Su ................................ 280/654 |

* cited by examiner

*Primary Examiner* — J. Allen Shriver, II
*Assistant Examiner* — Bryan Evans
(74) *Attorney, Agent, or Firm* — McNees Wallace & Nurick LLC

(57) ABSTRACT

A foldable cart includes a frame mechanism, a wheeled rear support mechanism and two spaced-apart handle units. The frame mechanism can be in a collapsed state or an expanded state. The wheeled rear support mechanism is mounted pivotally to a rear side of a main frame body of the frame mechanism and movable between a supporting position and a fully folded position with respect to the main frame body. The handle units are rotatably connected to the main frame body to drive the frame mechanism to be in the collapsed state or the expanded state.

10 Claims, 7 Drawing Sheets

FOLDABLE CART

CROSS-REFERENCE TO RELATED APPLICATION

This application claims priority of Taiwanese Application No. 102221515, filed on Nov. 18, 2013.

FIELD OF THE INVENTION

The invention relates to the field of hand trucks and carts, more particularly to a foldable cart.

BACKGROUND OF THE INVENTION

At a construction site, a conventional cart is generally used for moving a large number of construction materials, such as bricks or bags of cement. The conventional cart includes a carrier and two spaced-apart wheels that are mounted to the carrier. Although the conventional cart is convenient to use, the loaded conventional cart tends to become a heavy burden on a user's arms. In addition, the conventional cart may easily topple over when the loaded conventional cart is moved in a tilted orientation with respect to the ground by an unskilled user. For alleviating the abovementioned deficiencies, another conventional cart disclosed in U.S. Pat. No. 8,413,999 is proposed to provide a rear support mechanism with two spaced-apart rear support wheels that are rollable on the ground. In such a manner, the rear support mechanism with the rear support wheels not only prevents the conventional cart from being easily toppled, but also decreases the burden on the user's arms. However, since the conventional cart is unfoldable, it may occupy a relatively large amount of storage space.

SUMMARY OF THE INVENTION

Therefore, an object of the present invention is to provide a foldable cart that can alleviate the aforesaid drawbacks of the prior art.

According to the present invention, a foldable cart includes a frame mechanism, a wheeled rear support mechanism and two spaced-apart handle units.

The frame mechanism includes a longitudinal main frame body, a carrier frame, two spaced-apart front wheel members and a gear unit.

The carrier frame is pivotally connected to a bottom end of the main frame body and is rotatable in one of a forward-and-downward direction and a rearward-and-upward direction.

The front wheel members are respectively connected to two sides of the bottom end of the main frame body and respectively have horizontal shafts that are swivelable in a first horizontal plane.

The gear unit is connected to the main frame body, the carrier frame and the front wheel members.

When the frame mechanism is in a collapsed state, the carrier frame rotates in the reward-and-upward direction so as to be folded upward to confront with the main frame body above the bottom end, and the horizontal shafts of the front wheels are substantially in the front-rear direction of the main frame body to limit the front wheel members from rolling forward or rearward. When the frame mechanism is in an expanded state, the carrier frame is extended forward from the bottom end of the main frame body, and the horizontal shafts of the front wheel members are extended transversely to the front-rear direction of the main frame body to permit the front wheel members to roll forward or rearward.

The wheeled rear support mechanism is mounted pivotally to the main frame body opposite to the carrier frame and is movable between a supporting position where the wheeled rear support mechanism is unfolded to roll on the ground, and a fully folded position where the wheeled rear support mechanism is folded to move away from the ground.

The handle units are rotatably connected to the main frame body, and are respectively connected to the front wheel members. The handle units are further connected to the gear unit to drive the gear unit which in turn drives the carrier frame and the front wheel members so that the carrier frame is unfolded to extend forward or folded upward and the horizontal shafts swivel in the first horizontal plane.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
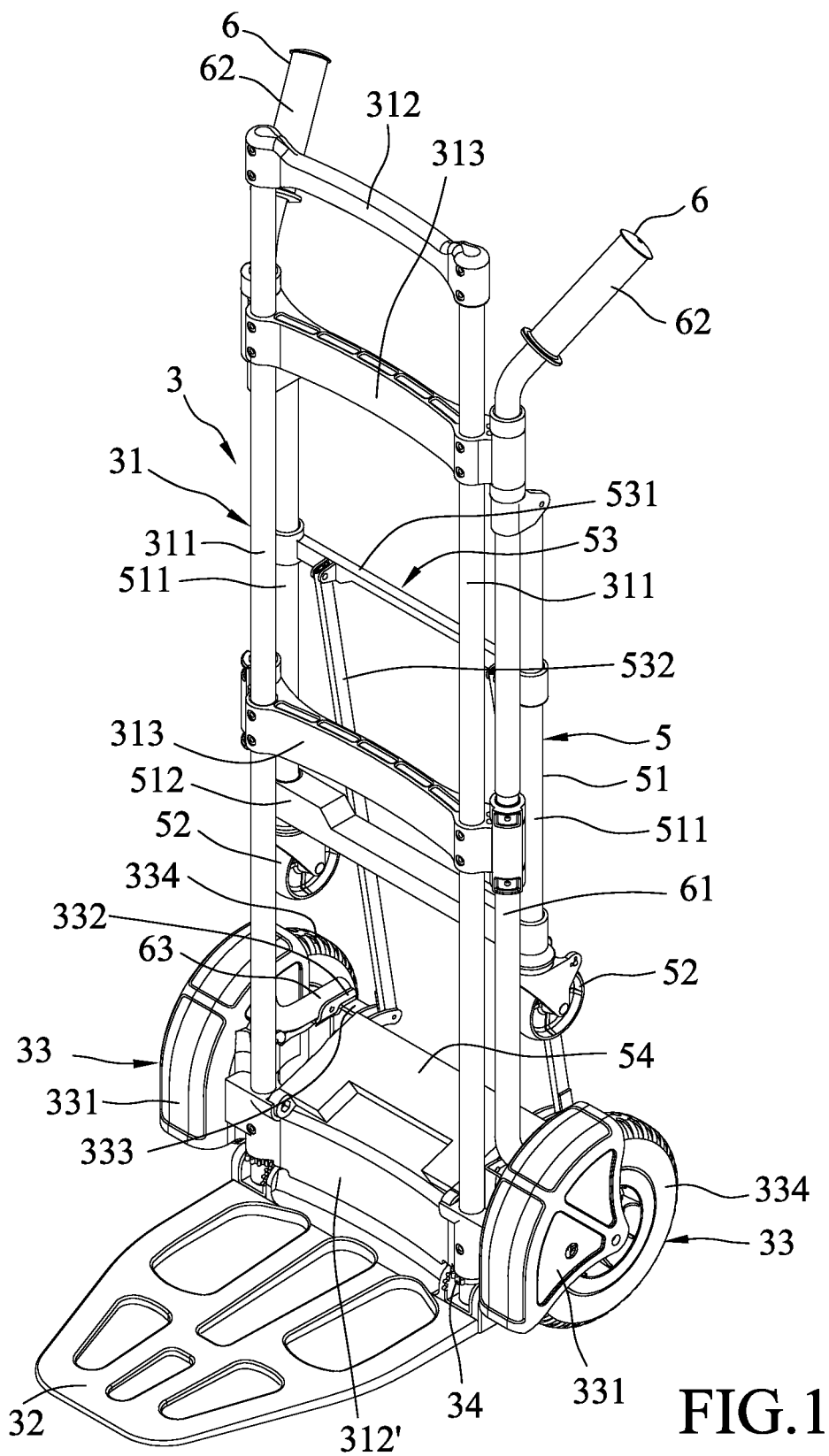
FIG. 1 is a perspective view illustrating an embodiment of a foldable cart according to the present invention when the foldable cart is used in a two-wheel drive mode.
Figure 2:
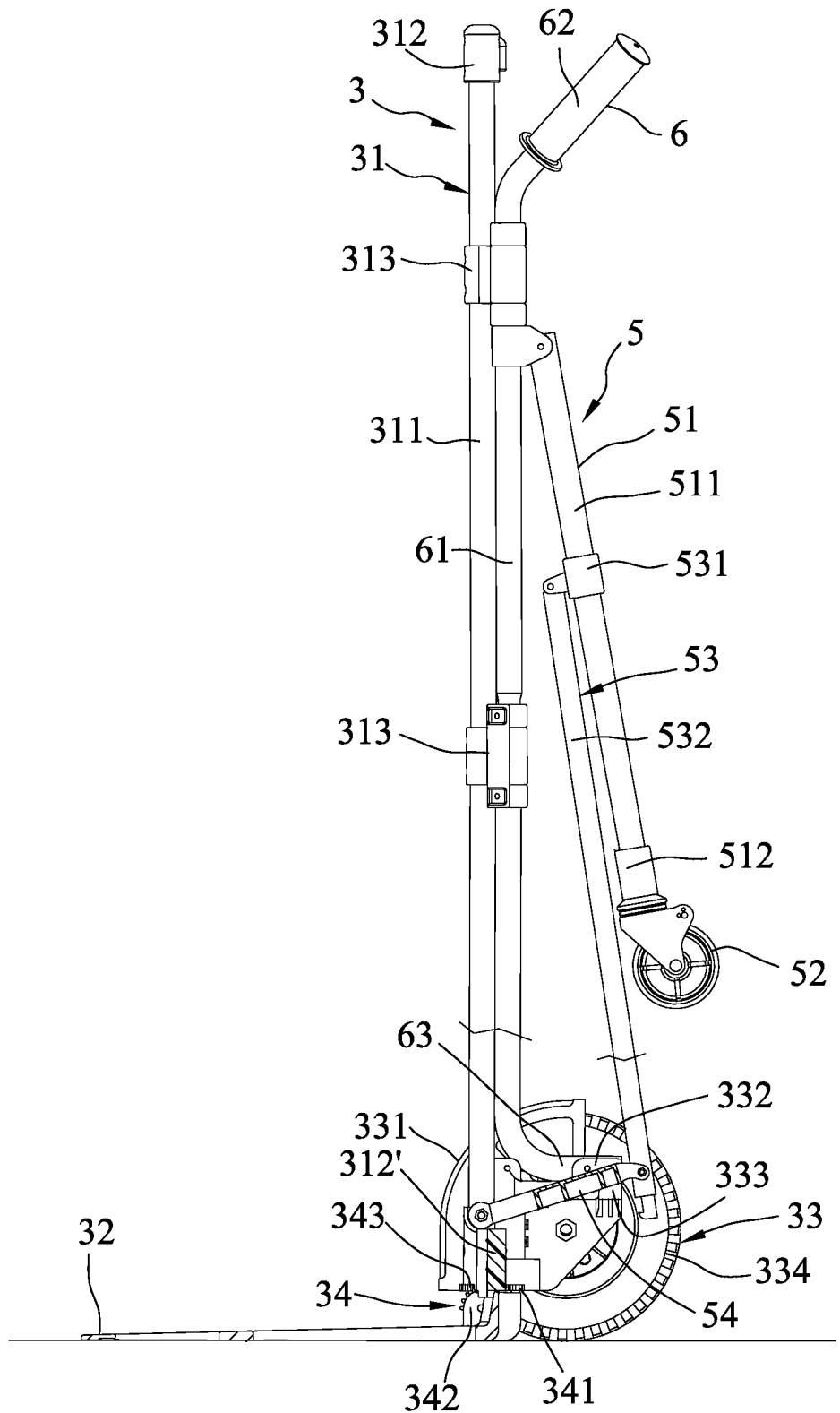
FIG. 2 is a partly sectional side view illustrating a wheeled rear support mechanism of the foldable cart in a half-folded position when the foldable cart is in the two-wheel drive mode.
Figure 3:
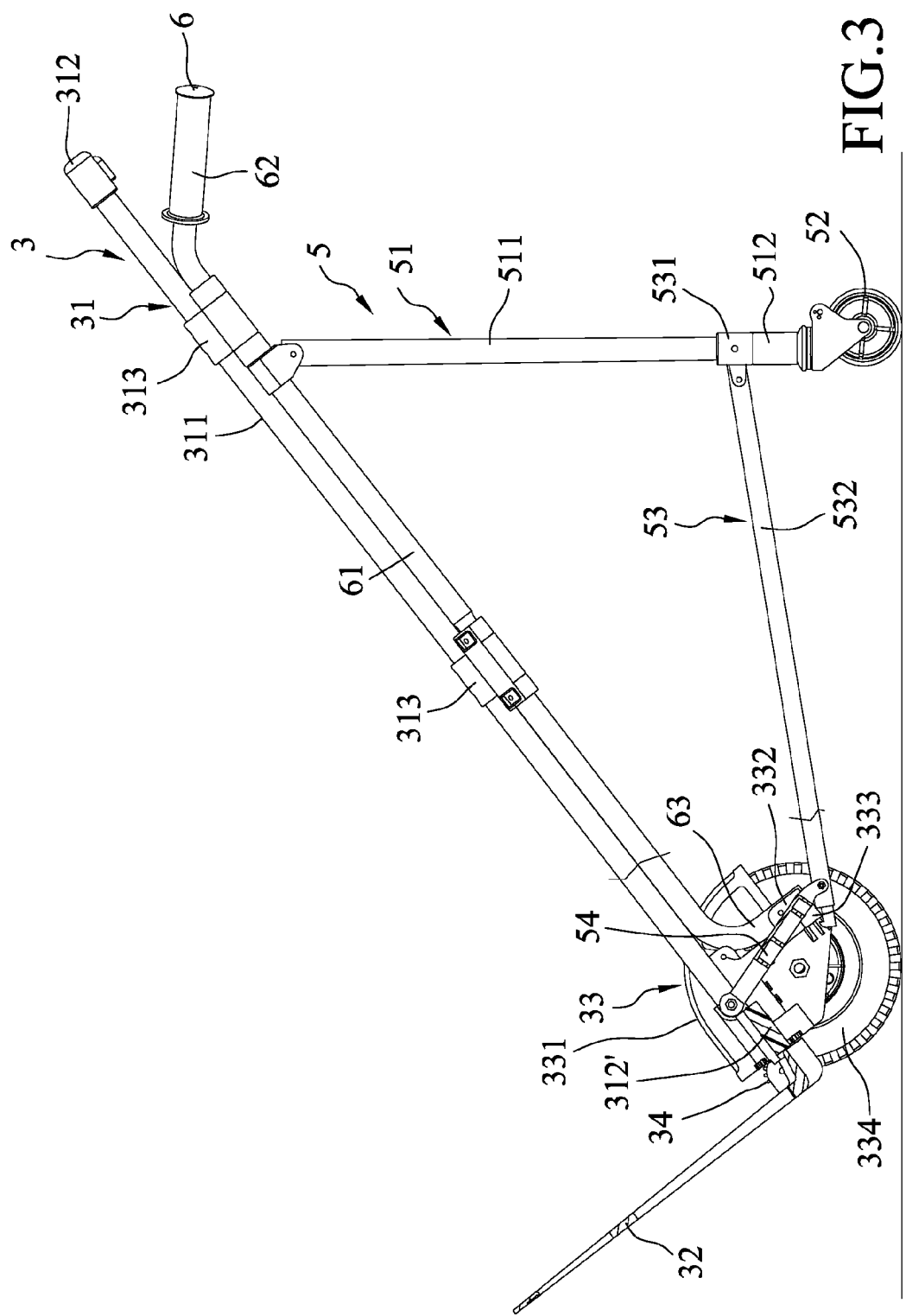
FIG. 3 is a partly sectional side view illustrating the foldable cart in a four-wheel drive mode and the wheeled rear support mechanism in a supporting position.

Referring to FIGS. 1 to 5, an embodiment of a foldable cart according to the present invention is illustrated. The foldable cart is suitable for carrying loads and is operable by a user in a two-wheel drive mode, a four-wheel drive mode, or a folded mode. In this embodiment, the foldable cart includes a frame mechanism 3, a wheeled rear support mechanism 5 and two spaced-apart handle units 6.

The frame mechanism 3 is driven by the handle units 6 between a collapsed state and an expanded state. In this embodiment, the frame mechanism 3 includes a longitudinal main frame body 31, a carrier frame 32 that is pivotally connected to a bottom end of the main frame body 31 and rotatable in a forward-and-downward direction to approach the main frame body 31 or a rearward-and-upward direction so as to depart from the main frame body 31, two spaced-apart front wheel members 33 that are respectively connected to two sides of the bottom end of the main frame body 31 and that respectively have horizontal shafts that are swivelable in a first horizontal plane, and a gear unit 34 that is connected to the main frame body 31, the carrier frame 32 and the front wheel members 33. When the frame mechanism 3 is in a collapsed state, the carrier frame 32 is folded upward to confront with the main frame body 31 above the bottom end, and the shafts of the front wheel members 33 are substantially in the front-rear direction of the main frame body 31 to limit the front wheel members 33 from rolling forward or rearward. When the frame mechanism 3 is in an expanded state, the carrier frame 32 is extended forward from the bottom end of the main frame body 31, and the horizontal shafts of the front wheel members 33 are extended transversely to the front-rear direction of the main frame body 31 to permit the front wheel members 33 to roll forward or rearward.

In this embodiment, the main frame body 31 has two spaced-apart main rods 311, and top and bottom transverse bars 312, 312'. The top transverse bar 312 is connected between top ends of the main rods 311. The bottom transverse bar 312' is connected between bottom ends of the main rods 311. In addition, the main frame body 31 further has two spaced-apart transverse rods 313 which are disposed between the top and bottom transverse bars 312, 312'. Each of the spaced-apart transverse rods 313 has two opposite ends that are connected respectively to the main rods 311 and that respectively have two tubular pivot seats projecting respectively from the main rods 311.

Figure 4:
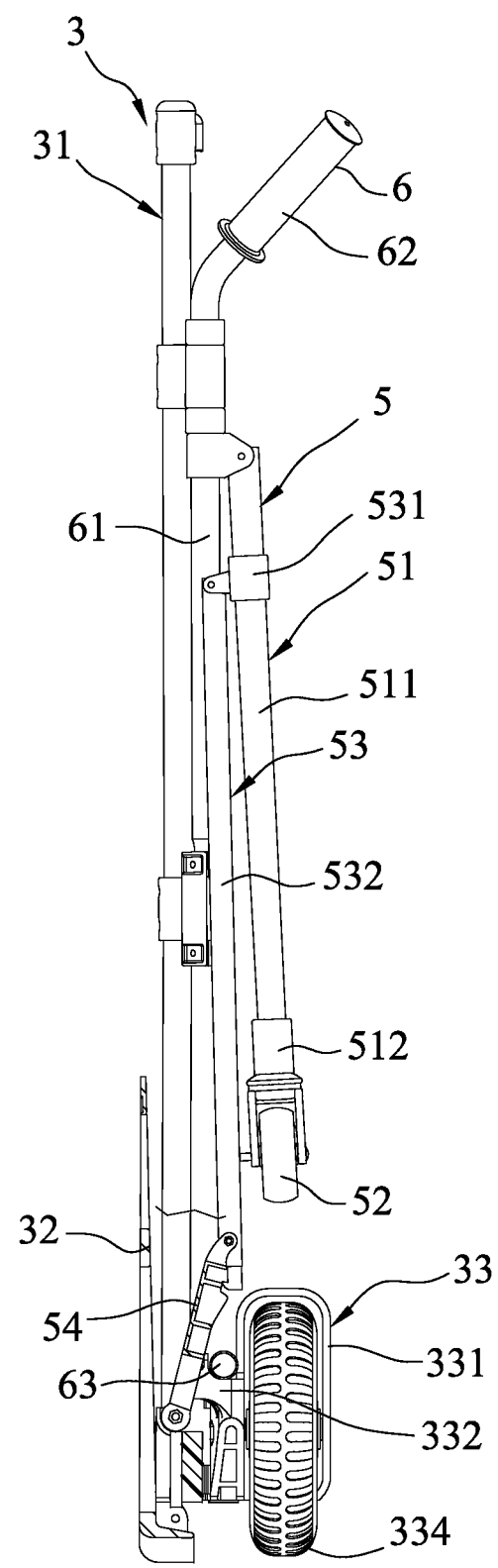
FIG. 4 is a partly sectional side view illustrating the foldable cart in a folded state and the wheeled rear support mechanism in a fully folded position.
Figure 5:
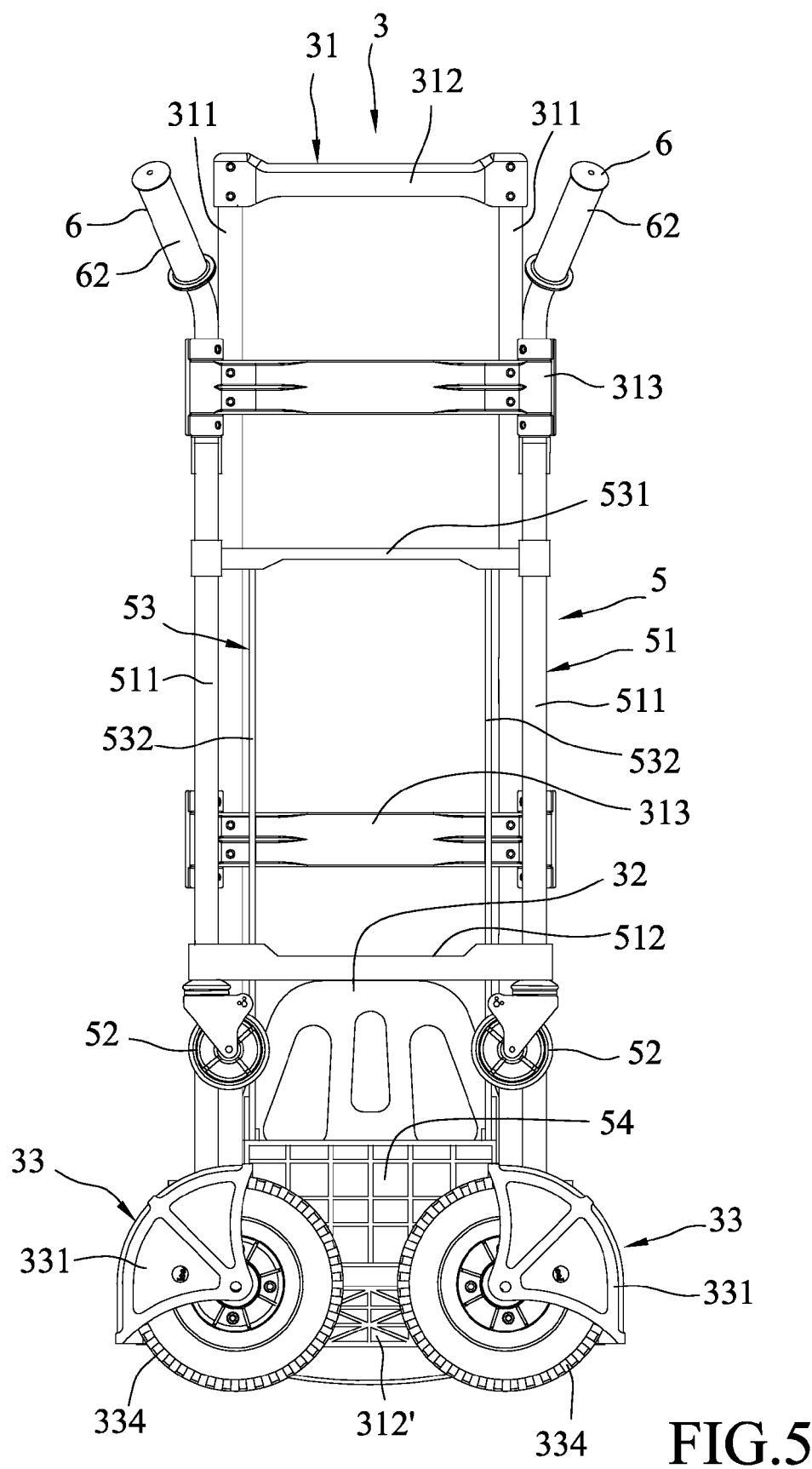
FIG. 5 is a rear view illustrating the foldable cart in the folded state and the wheeled rear support mechanism in the fully folded position.

The front wheel members 33 are respectively and pivotally mounted to two opposite sides of the bottom transverse bar 312'. Each of the front wheel members 33 has a wheel bracket 331 that is swivelably disposed at a corresponding one of the two sides of the main frame body 31, and a front wheel 334 that is mounted in the wheel bracket 331. In this embodiment, the wheel bracket 331 is pivotally connected to a respective one of the two opposite sides of the bottom transverse bar 312' and has a joining portion 332. Specifically, the wheel bracket 331 of each of the front wheel members 33 further has a limiting seat 333 transversely extending from the joining portion 332 in a direction toward the wheel bracket 331 of the other one of the front wheel members 33 when the frame mechanism 3 is in the expanded state. For each of the front wheel members 33, the wheel bracket 331 is swivelably driven to move the front wheel 334 to a position corresponding to a rear side of the main frame body 31 to be opposite to the carrier frame 32 so that the front wheel 334 is rotatable in a vertical plane perpendicular to the first horizontal plane (as shown in FIGS. 4 and 5).

Figure 6:
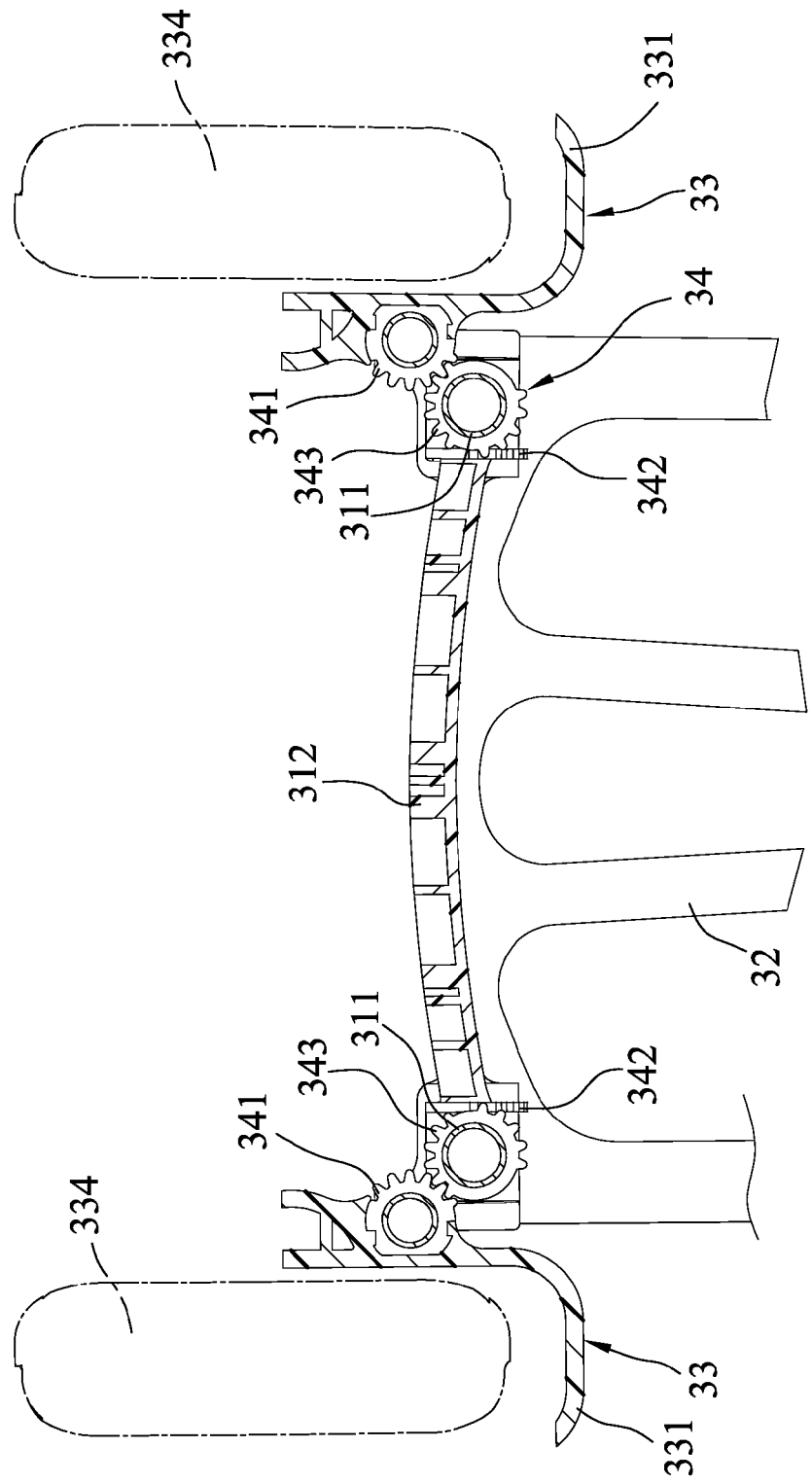
FIG. 6 is a fragmentary, partly sectional top view illustrating the foldable cart having a carrier frame, two front wheel members and a gear unit, and an expanded state of a frame mechanism of the foldable cart.
Figure 7:
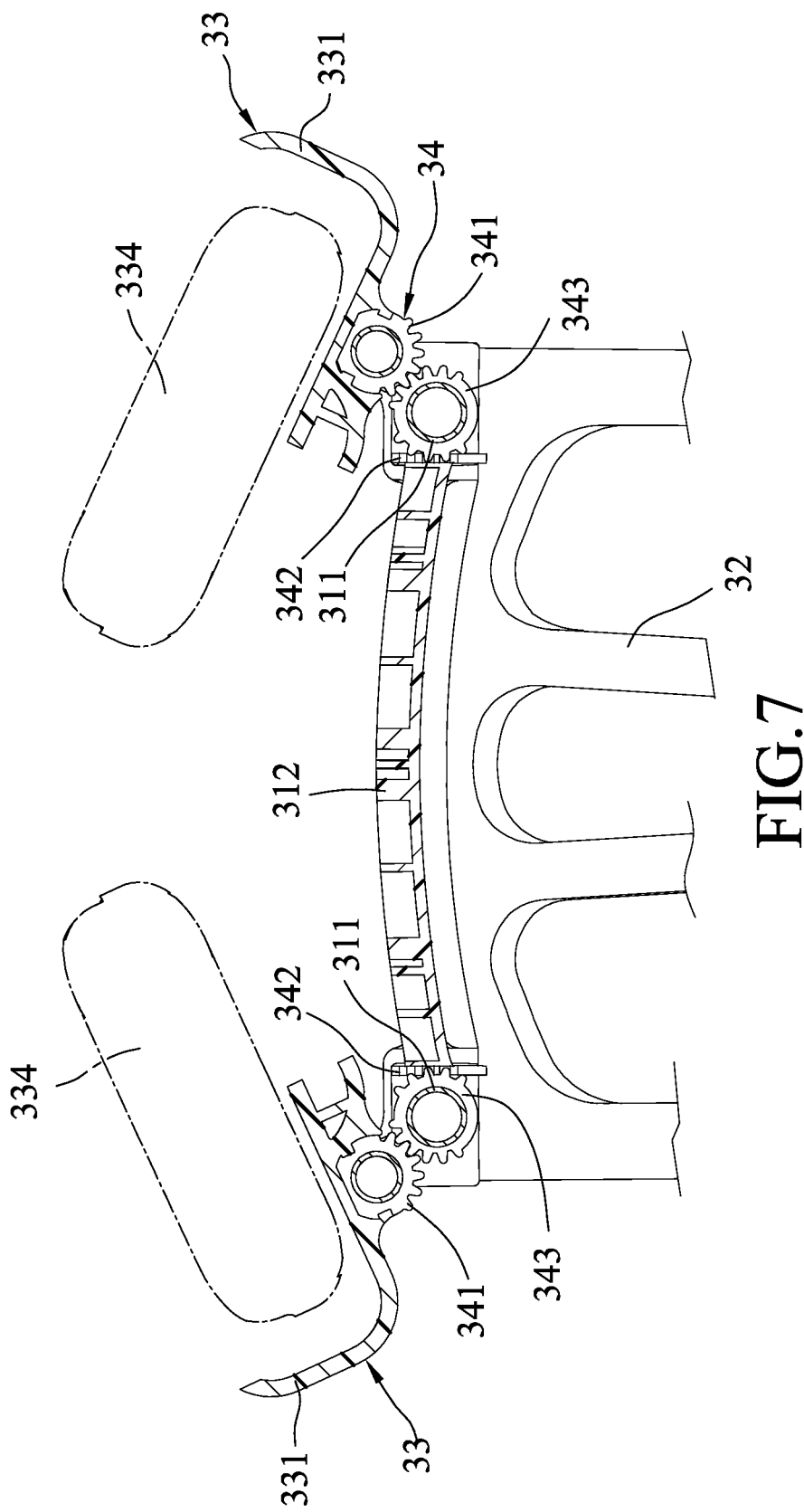
FIG. 7 is a view similar to FIG. 6, but illustrating a driving relationship among the gear unit driving rotation, the carrier frame and the front wheel members when the frame mechanism of the foldable cart is moved from the expanded state to a collapsed state.

Referring to FIGS. 6 and 7, the gear unit 34 has two first gears 341 that are respectively and coaxially connected to the wheel brackets 331 of the front wheel members 33 and that are rotatable in the first horizontal plane, two second gears 342 that are connected coaxially to the carrier frame 32 and rotatable in the vertical plane, and two third gears 343 that are respectively mounted on and sleeved around the bottom ends of the main rods 311 of the main frame body 31. Each of the third gears 343 meshes with a respective one of the first gears 341 and a respective one of the second gears 342. By virtue of the gear unit 34, when the wheel brackets 331 of the front wheel members 33 are swiveled relative to the main frame body 31, the first gears 341, the third gears 343 and the second gears 342 are driven to rotate concomitantly relative to each other such that the carrier frame 32 is rotatable rearward and upward or forward and downward relative to the main frame body 31.

In this embodiment, the wheeled rear support mechanism 5 is mounted pivotally to the main frame body 31 opposite to the carrier frame 32 and is movable between a supporting position where the wheeled rear support mechanism 5 is unfolded to roll on the ground, and a fully folded position where the wheeled rear support mechanism 5 is folded to move away from the ground.

Referring back to FIGS. 1 and 3, the wheeled rear support mechanism 5 includes a rear support frame 51 that has a top end pivotally connected to the main frame body 31 and a bottom end opposite to the top end, two rear wheels 52 that are mounted to the bottom end of the rear support frame 51, a first link member 53 that has a first end pivotally connected to and slidable along the rear support frame 51 and a second end opposite to the first end, and a second link member 54 that has a front end pivotally connected to the main frame body 31 and a rear end pivotally connected to the second end of the first link member 53. When the wheeled rear support mechanism 5 moves to the supporting position from the fully folded position, the rear end of the second link member 54 extends away from the main frame body 31 and abuts against the front wheel members 33, and the first end of the first link member 53 slides downward on the rear support frame 51 such that the first link member 53 extends substantially in the front-rear direction to move the bottom end of the rear support frame 51 away from the main frame body 31.

The rear support frame 51 further has two spaced-apart rear rods 511 that extend from the top end to the bottom end of the rear support frame 51 and that are pivotally connected to the main frame body 31 in proximity to the top end of the rear support frame 51, and a cross bar 512 that is connected between the rear rods 511 in proximity to the bottom end of the rear support frame 51. In this embodiment, the rear rods 511 are respectively and pivotally connected to the two opposite ends of an upper one of the transverse rods 313. The rear wheels 52 of the rear support mechanism 5 are rotatable in a second horizontal plane. Specifically, the rear wheels 52 are respectively connected to the rear rods 511 at the bottom end of the rear support frame 51 and are respectively rotatable in 360 degrees about the rear rods 511. The first link member 53 has a slide rod 531 with two opposite ends slidably and respectively connected to the rear rods 511 at the first end of the first link member 53, and two spaced-apart first link rods 532 pivotally and respectively connected to the two opposite ends of the slide rod 531. When the two opposite ends of the slide rod 531 are respectively slid along the rear rods 511, the first link rods 532 are driven by the two opposite ends of the slide rod 531 to more relative to the rear rods 511. The second link member 54 is connected pivotally to the bottom ends of the main rods 311 of the main frame body 31 and is further connected pivotally between the first link rods 532. In this embodiment, the second link member 54 is in the form of a plate. The front end of the second link member 54 is pivotally disposed between the main rods 311. The rear end of the second link member 54 is disposed pivotally between the first link rods 532. The rear end of the second link member 54 is seated on the limiting seats 333 to limit movement of the joining portions 332 so that the wheel brackets 331 of the front wheel members 33 are prevented from swiveling when the wheeled rear support mechanism 5 is in the supporting position.

Referring back to FIG. 2, the wheeled rear support mechanism 5 is further movable to a half-folded position intermediate of the fully folded and expanded positions, and, when the wheeled rear support mechanism 5 moves from the fully folded position to the half-folded position, the rear end of the second link member 54 is seated on the limiting seats 333 between the joining portions 332, and the first end of the first link member 53 slides upward on the rear support frame 51 to move the bottom end of the rear support frame 51 to the main frame body 31.

As shown in FIGS. 1 to 5, the handle units 6 are rotatably connected to the main frame body 31 and are respectively connected to the front wheel members 33. The handle units 6 are further connected to the gear unit 34 to drive the gear unit 34 which in turn drives the carrier frame 32 and the front wheel members 33 so that the carrier frame 32 is unfolded to extend forward or folded upward and the horizontal shafts swivel in the first horizontal plane. Each of the handle units 6 has a transmission rod 61 that is connected to the main frame body 31 and that is coaxial with the wheel bracket 331, a handlebar 62 that bends from a top end of the transmission rod 61, and a driving bar 63 that bends from a bottom end of the transmission rod 61. In this embodiment, the transmission rods 61 of the handle units 6 are respectively connected to the main rods 311. Specifically, the transmission rods 61 of the handle units 6 respectively extend through the tubular pivot seats of the transverse rods 313. The rear rods 511 are respectively connected to the transmission rods 61. The driving bar 63 is connected to the joining portion 332 of the wheel bracket 331. The handlebar 62 is operable to rotate the transmission rod 61 and the driving bar 63 so as to swivel the wheel bracket 331.

In accordance with the user's requirements, the frame mechanism 3 and the wheeled rear support mechanism 5 are operable to be in a selected one of the two-wheel drive mode and the four-wheel drive mode for carrying loads. When the two-wheel drive mode is selected, the frame mechanism 3 is in the expanded state and the wheeled rear support mechanism 5 is in the half-folded position. In such a manner, the carrier frame 32 is rotated forward and downward relative to the main frame body 31, and an angle of substantially 90 degrees is formed between the carrier frame 32 and the main frame body 31. The horizontal shafts of the front wheel members 33 are extended transversely to the front-rear direction of the main frame body 31 such that the front wheel members 33 can roll forward or rearward. The slide rod 531 of the first link member 53 is slidably disposed on the rear rods 511 in proximity to the top end of the rear support frame 51. The bottom end of the rear support frame 51 is moved toward the rear side of the main frame body 31. Since the rear end of the second link member 54 is seated on the limiting seats 333 between the joining portions 332, the second link member 54 prevents the frame mechanism 3 from being collapsed when the foldable cart carries the loads.

The foldable cart can be operated from the two-wheel drive mode to the four-wheel drive mode by moving the wheeled rear support mechanism 5 to the supporting position. In the four-wheel drive mode, the slide rod 531 of the first link member 53 is slid and disposed on the rear rods 511 in proximity to the bottom end of the rear support frame 51. With a four-link transmission principle, since the slide rod 531 of the first link member 53 is moved away from the bottom end of the main frame body 31, the first link member 53 extends substantially in the front-rear direction relative to the main frame body 31, and thus, the bottom end of the rear support frame 51 is moved away from the main frame body 31. In addition, since the rear end of the second link member 54 extends away from the main frame body 31 and abuts against the front wheel members 33, the rear support frame 51 is prevented from being pivotally moved relative to the main frame body 31. By the user pushing down the handlebars 62 of the handle units 6, the rear wheels 52 of the rear support mechanism 5 are rotatable on the ground. When the foldable cart is completely in the four-wheel drive mode, the frame mechanism 3 and the rear support mechanism 5 cooperatively support the loads such that the foldable cart is convenient and steady to carry the loads.

When the foldable cart is to be stored, the rear support mechanism 5 is required to be moved to the fully folded position before the frame mechanism 3 is in the collapsed state. When the wheeled rear support mechanism 5 moves to the fully folded position, the rear end of the second link member 54 moves away from the limiting seats 333 and is folded over the rear side of the main frame body 31. After the rear support mechanism 5 is in the fully folded position, for each of the handle units 6, the handlebar 62 is operated to rotate the transmission rod 61 and the driving bar 63 so as to drive the front wheel members 33 to be swiveled to the rear side of the main frame body 31. Since the first gears 341, the third gears 343 and the second gears 342 are driven to be rotated concomitantly relative to each other, the carrier frame 32 is driven by the gear unit 34 to rotate rearward and upward relative to the main frame body 31. In such a manner, the frame mechanism 3 is in the collapsed state, and the swiveling of the wheel brackets 331 pushes the second link member 54 to move forward and toward the main frame body 31 and to be positioned at the rear side of the main frame body 31. The rear end of the second link member 54 is prevented from being moved away from the main frame body 31. As a result, the foldable cart is completely folded.

Since the wheeled rear support mechanism 5 is in the fully folded position and the frame mechanism 3 is in the collapsed state, the carrier frame 32 is folded upward to confront with the front side of the main frame body 31, the wheel brackets 331 and the front wheels 334 of the wheel members 33 are swiveled in a position corresponding to the rear side of the main frame body 31, and the bottom end of the rear support frame 51 is proximate to the rear side of the main frame body 31. In such an arrangement, the foldable cart has a relatively small size and occupies in a relatively small storing space.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A foldable cart comprising:
a frame mechanism including
 a longitudinal main frame body,
 a carrier frame pivotally connected to a bottom end of said main frame body and rotatable in one of a forward-and-downward direction and a rearward-and-upward direction;
 two spaced-apart front wheel members respectively connected to two sides of said bottom end of said main frame body and respectively having horizontal shafts that are swivelable in a first horizontal plane, and
 a gear unit connected to said main frame body, said carrier frame and said front wheel members,
 wherein, when said frame mechanism is in a collapsed state, said carrier frame is folded upward to confront with said main frame body above said bottom end, and said horizontal shafts of said front wheel members are substantially in the front-rear direction of said main frame body to limit said front wheel members from rolling forward or rearward, and when said frame mechanism is in an expanded state, said carrier frame is extended forward from said bottom end of said main frame body, and said horizontal shafts of said front wheel members are extended transversely to the front-rear direction of said main frame body to permit said front wheel members to roll forward or rearward;

a wheeled rear support mechanism mounted pivotally to said main frame body opposite to said carrier frame and movable between a supporting position where said wheeled rear support mechanism is unfolded to roll on the ground, and a fully folded position where said wheeled rear support mechanism is folded to move away from the ground; and two spaced-apart handle units rotatably connected to said main frame body and respectively connected to said front wheel members, said handle units being further connected to said gear unit to drive said gear unit which in turn drives said carrier frame and said front wheel members so that said carrier frame is unfolded to extend forward or folded upward and said horizontal shafts swivel in the first horizontal plane, wherein said wheeled rear support mechanism includes a rear support frame that has a top end pivotally connected to said main frame body and a bottom end opposite to the top end, two rear wheels that are mounted to the bottom end of said rear support frame, a first link member that has a first end pivotally connected to and slidable along said rear support frame, and a second end opposite to the first end, and a second link member having a front end pivotally connected to said main frame body and a rear end pivotally connected to the second end of said first link member; and wherein, when said wheeled rear support mechanism moves to the supporting position from the fully folded position, said rear end of said second link member extends away from said main frame body and abuts against said front wheel members, and said first end of said first link member slides downward on said rear support frame such that said first link member extends substantially in the front-rear direction to move said bottom end of said rear support frame away from said main frame body.

2. The foldable cart as claimed in claim 1, wherein each of said front wheel members has a wheel bracket that is swivelably disposed at a corresponding one of said two sides of said main frame body and a front wheel that is mounted in said wheel bracket, said wheel bracket having a joining portion, each of said handle units having a transmission rod that is connected to said main frame body and that is coaxial with said wheel bracket, a handlebar that bends from a top end of said transmission rod, and a driving bar that bends from a bottom end of transmission rod, said driving bar being connected to said joining portion of said wheel bracket, said handlebar being operable to rotate said transmission rod and said driving bar so as to swivel said wheel bracket.

3. The foldable cart as claimed in claim 2, wherein said wheel brackets of each of said front wheel members further has a limiting seat transversely extending from said joining portion in a direction toward said wheel bracket of the other one of said front wheel members when said frame mechanism is in the expanded state, said rear end of said second link member being seated on said limiting seats to limit movements of said joining portions so that said wheel brackets of said front wheel members are prevented from swiveling when said wheeled rear support mechanism is in the supporting position.

4. The foldable cart as claimed in claim 3, wherein said wheeled rear support mechanism is further movable to a half-folded position intermediate of the fully folded and expanded positions, and, when said wheeled rear support mechanism moves from the fully folded position to the half-folded position, said rear end of said second link member is seated on said limiting seats between said joining portions, and said first end of said first link member slides upward on said rear support frame to move said bottom end of said rear support frame to said main frame body.

5. The foldable cart as claimed in claim 2, wherein, when said wheeled rear support mechanism moves to the fully folded position, said rear end of said second link member moves away from said limiting seats and is folded over a rear side of said main frame body, and the swiveling of said wheel brackets pushes said second link member to move forward and toward said main frame body and to be positioned at the rear side of said main frame body.

6. The foldable cart as claimed in claim 2, wherein said rear support frame further has two spaced-apart rear rods that extend from said top end to said bottom end of said rear support frame and that is pivotally connected to said main frame body in proximity to said top end of said rear support frame, and a cross bar that is connected between said rear rods in proximity to said bottom end of said rear support frame, said rear wheels being respectively connected to said rear rods at said bottom end of said rear support frame, said first link member having a slide rod with two opposite ends slidably and respectively connected to said rear rods at said first end of said first link member and two spaced-apart first link rods pivotally and respectively connected to said two opposite ends of said slide rod, said second link member being connected pivotally to said main frame body and further connected pivotally between said first link rods.

7. The foldable cart as claimed in claim 6, wherein said rear wheels of said rear support mechanism are rotatable in a second horizontal plane parallel with the first horizontal plane.

8. The foldable cart as claimed in claim 6, wherein said main frame body has two spaced-apart main rods, and top and bottom transverse bars, said top transverse bar being connected between top ends of said main rods, said bottom transverse bar being connected between bottom ends of said main rods, said transmission rods of said handle units being respectively connected to said main rods, said rear rods being respectively connected to said transmission rods, said front end of said second link member being pivotally disposed between said main rods, said rear end of said second link member being disposed pivotally between said first link rods.

9. The foldable cart as claimed in claim 8, wherein said main frame body further has two spaced-apart transverse rods which are disposed between said top and bottom transverse bars and each of which has two opposite ends connected respectively to said main rods, said two opposite ends of each of said transverse rods respectively having two tubular pivot seats projecting respectively from said main rods, said transmission rods of said handle units respectively extending through said tubular pivot seats of each of said transverse rods.

10. The foldable cart as claimed in claim 1, wherein said gear unit has two first gears that are respectively and coaxially connected to said front wheel members and that are rotatable in the first horizontal plane, two second gears that are connected coaxially to said carrier frame and rotatable in a vertical plane perpendicular to the first horizontal plane, and two third gears that are mounted on said main frame body, each of said third gears meshing with a respective one of said first gears and a respective one of said second gears.

* * * * *